(12) United States Patent
Hayashi et al.

(10) Patent No.: US 9,240,743 B2
(45) Date of Patent: Jan. 19, 2016

(54) VEHICLE POWER-GENERATION CONTROL DEVICE AND CONTROL METHOD THEREOF

(75) Inventors: Kensuke Hayashi, Chiyoda-ku (JP); Keiichi Enoki, Chiyoda-ku (JP); Yoshimasa Nishijima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 14/373,668

(22) PCT Filed: Apr. 11, 2012

(86) PCT No.: PCT/JP2012/059872
§ 371 (c)(1),
(2), (4) Date: Jul. 22, 2014

(87) PCT Pub. No.: WO2013/153630
PCT Pub. Date: Oct. 17, 2013

(65) Prior Publication Data
US 2015/0008889 A1   Jan. 8, 2015

(51) Int. Cl.
*H02P 11/00* (2006.01)
*H02H 7/06* (2006.01)
(Continued)

(52) U.S. Cl.
CPC . *H02P 9/48* (2013.01); *B60K 6/485* (2013.01); *B60L 11/02* (2013.01); *B60W 10/08* (2013.01);
(Continued)

(58) Field of Classification Search
USPC .............. 322/24; 318/432; 363/178; 307/9.1
See application file for complete search history.

(56) References Cited

U.S. PATENT DOCUMENTS

| 7,808,194 B2* | 10/2010 | Egami | B60K 6/445 318/139 |
| 8,063,596 B2* | 11/2011 | Imura | B60L 15/025 318/400.01 |

(Continued)

FOREIGN PATENT DOCUMENTS

| JP | 60-160342 A | 8/1985 |
| JP | 10-94295 A | 4/1998 |

(Continued)

OTHER PUBLICATIONS

International Search Report for PCT/JP2012/059872 dated Jul. 3, 2012 (PCT/ISA/210).

*Primary Examiner* — Pedro J Cuevas
(74) *Attorney, Agent, or Firm* — Sughrue Mion, PLLC; Richard C. Turner

(57) ABSTRACT

Provided is a power-generation control device capable of appropriately using a drive belt looped around a power generator and an internal-combustion engine mounted on a vehicle. The device monitors a difference between an actual generated current of a rotating electrical machine and an estimated generated current estimated from estimated power-generation torque for controlling power generation of the rotating electrical machine, which corresponds to a power-generation torque command, or the like. When a difference equal to or more than a predetermined value occurs between the actual and the estimated generated currents, the power-generation control device limits the estimated power-generation torque so as to be reduced, and further limits the estimated power-generation torque with use of learning limiting power-generation torque calculated based on the estimated power-generation torque at a time when the difference has occurred between the actual generated current and the estimated generated current.

14 Claims, 11 Drawing Sheets

(51) Int. Cl.
*H02P 9/00* (2006.01)
*H02P 9/48* (2006.01)
*B60W 10/08* (2006.01)
*B60W 20/00* (2006.01)
*B60K 6/485* (2007.10)
*H02P 9/14* (2006.01)
*B60L 11/02* (2006.01)
*H02P 7/00* (2006.01)

(52) U.S. Cl.
CPC .................. *B60W 20/00* (2013.01); *H02P 9/14* (2013.01); *B60W 2510/084* (2013.01); *B60W 2710/083* (2013.01); *Y02T 10/6226* (2013.01)

(56) References Cited

U.S. PATENT DOCUMENTS

| | | | | |
|---|---|---|---|---|
| 8,148,937 | B2* | 4/2012 | Itoh | H02P 21/0089 123/179.5 |
| 8,253,365 | B2* | 8/2012 | Yeh | G01R 31/343 318/400.15 |
| 8,288,985 | B2* | 10/2012 | Takahashi | H02P 21/0046 318/400.3 |
| 8,395,277 | B2* | 3/2013 | Yamakawa | B60L 9/18 307/9.1 |
| 8,427,088 | B2* | 4/2013 | Imura | H02P 6/08 318/400.07 |
| 8,760,003 | B2* | 6/2014 | Imura | B60L 3/0015 307/9.1 |
| 8,901,869 | B2* | 12/2014 | Wai | H02P 25/087 318/432 |
| 2004/0007997 | A1* | 1/2004 | Fu | H02P 21/06 318/432 |
| 2008/0143286 | A1* | 6/2008 | Egami | B60K 6/445 318/432 |
| 2011/0006598 | A1* | 1/2011 | Yamakawa | B60L 9/18 307/9.1 |
| 2012/0026771 | A1* | 2/2012 | Imura | B60L 3/0015 363/178 |
| 2015/0008889 | A1* | 1/2015 | Hayashi | B60W 10/08 322/24 |

FOREIGN PATENT DOCUMENTS

JP       11-82094 A      3/1999
JP       2009-214738 A     9/2009

* cited by examiner

VEHICLE POWER-GENERATION CONTROL DEVICE AND CONTROL METHOD THEREOF

CROSS REFERENCE TO RELATED APPLICATIONS

This application is a National Stage of International Application No. PCT/JP2012/059872 filed Apr. 11, 2012, the contents of which are incorporated herein by reference in their entirety.

TECHNICAL FIELD

The present invention relates to a vehicle power-generation control device and the like which appropriately use a drive belt looped around an internal-combustion engine and a power generator of a vehicle.

BACKGROUND ART

In recent years, as a technology for reducing fuel consumption of vehicles, vehicles have been developed, which recover kinetic energy at a time of a decrease in speed of vehicles as electric power by power regeneration. In this technology, motive power is transmitted by a drive belt looped around an internal-combustion engine and a power generator. However, when power-generation torque is increased so as to obtain a larger power-regeneration amount, the drive belt may slip due to large force applied thereto.

When feedback control is performed with use of generated power as a command value, in the case where a belt slip occurs, the generated power decreases due to a decrease in revolution speed of the power generator, and a field current increases when feedback control is performed so as to maintain the generated power at the command value. Further, in the case where the grip of the drive belt is recovered, the original revolution speed of the power generator is recovered while the field current is output as a result of the feedback control performed so as to set the generated power at the command value with respect to the decreased the revolution speed of the power generator. Therefore, there is a risk in that the power-generation amount of the power generator rapidly increases to damage equipment. In Patent Literature 1, the above-mentioned point is referred to as a problem, and an apparatus disclosed in Patent Literature 1 solves the above-mentioned problem by limiting, when the belt slip occurs, a field current to a field current value calculated from the revolution speed of an engine, that is, a revolution speed of the power generator at a time of recovery of grip so that generated power becomes a command value, thereby preventing a rapid increase in power-generation amount of the power generator.

CITATION LIST

Patent Literature

[PTL 1] JP 2009-214738 A

SUMMARY OF INVENTION

Technical Problem

In the above-mentioned related-art apparatus, the power-generation amount is not determined considering the drive belt slip, and hence there is a concern that a slip state may not be recovered at a time of occurrence of the belt slip. When the belt slip state continues, there arises a problem in that abnormal noise and wear of a mechanism may occur due to the sliding of the drive belt. Further, the kinetic energy at a time of a decrease in speed of a vehicle cannot be necessarily utilized up to a slip limit of the drive belt, and hence there is a demand for obtaining a larger power-generation amount.

The present invention has been made to solve the above-mentioned problems, and it is an object of the present invention to provide a vehicle power-generation control device and the like in which abnormal noise and wear of a mechanism due to the sliding of a drive belt are reduced even in the case where the drive belt slips, and the kinetic energy at a time of a decrease in speed of a vehicle is utilized up to a slip limit of the drive belt so as to increase the power-generation amount.

Solution to Problem

According to one embodiment of the present invention, there is provided a vehicle power-generation control device for a vehicle including: an internal-combustion engine for giving and receiving motive power with respect to a drive shaft of the vehicle; and a rotating electrical machine for giving and receiving motive power with respect to the internal-combustion engine through a drive belt, the rotating electrical machine being subjected to variable output control, the vehicle power-generation control device including: a rotating electrical machine revolution speed acquiring section for determining a revolution speed of the rotating electrical machine; a rotating electrical machine voltage detecting section for detecting a voltage of the rotating electrical machine; a rotating electrical machine current detecting section for determining an actual current of the rotating electrical machine; a power-generation torque command generating section for calculating a power-generation torque command for the rotating electrical machine based on a state of the vehicle; a generated current estimating section for estimating a rotating electrical machine estimated current based on estimated power-generation torque for controlling power generation of the rotating electrical machine based on the power-generation torque command, a rotating electrical machine revolution speed determined by the rotating electrical machine revolution speed acquiring section, and a rotating electrical machine voltage determined by the rotating electrical machine voltage detecting section; a generated current difference determining section for determining that a generated current difference has occurred in a case where a rotating electrical machine actual current detected by the rotating electrical machine current detecting section is smaller by a first predetermined value or more than the rotating electrical machine estimated current estimated by the generated current estimating section and outputting limiting power-generation torque for limiting the power-generation torque command, and determining that the generated current difference has not occurred in a case where a difference between the rotating electrical machine actual current and the rotation electrical machine estimated current is smaller than a second predetermined value which is smaller than the first predetermined value from a state in which the generated current difference has occurred and stopping output of the limiting power-generation torque; and a power-generation control section for controlling the power generation of the rotating electrical machine in accordance with the estimated power-generation torque with use of the power-generation torque command as the estimated power-generation torque, and controlling the power generation of the rotating electrical machine in accordance with the estimated power-generation torque obtained by limiting the power-generation torque command to the limiting power-generation torque at a time of occurrence of the generated current difference.

Advantageous Effects of Invention

In the vehicle power-generation control device and the like according to one embodiment of the present invention, even in the case where the drive belt slips, the drive belt may be rapidly recovered from a slip state. In this manner, abnormal noise and wear of a mechanism due to the sliding of the drive belt may be reduced, and the power-generation amount obtained in a range of the slip limit of the drive belt may be increased.

DESCRIPTION OF EMBODIMENTS

Now, a vehicle power-generation control device or the like according to each of embodiments of the present invention is described with reference to the drawings. Note that, in each embodiment, like components are denoted by like reference symbols, and repeated descriptions are omitted.

First Embodiment

Figure 1:
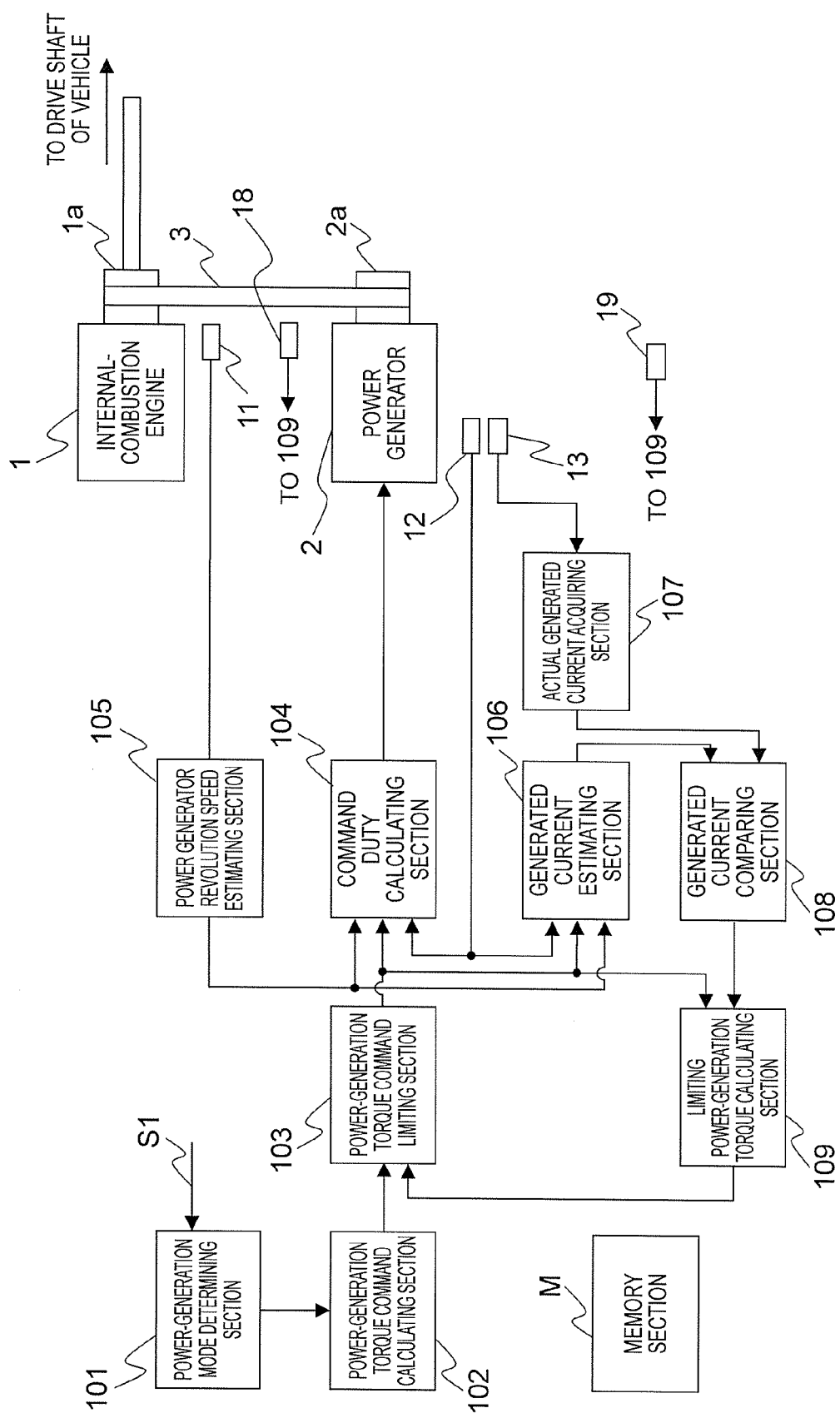
FIG. 1 is a block diagram of a vehicle including a vehicle power-generation control device according to the present invention.

FIG. 1 is a block diagram of a vehicle including a vehicle power-generation control device according to a first embodiment of the present invention. In FIG. 1, an internal-combustion engine 1 generates motive power by combusting fuel with a motive power source of a vehicle, and gives and receives motive power with respect to a vehicle drive shaft. A speed gear (not shown) may be provided between the internal-combustion engine 1 and the vehicle drive shaft. A power generator 2 is a power generator for generating electric power by giving and receiving motive power with respect to the internal-combustion engine 1 through a drive belt 3 looped around a pulley 1a of the internal-combustion engine 1 and a pulley 2a of the power generator 2. The power generator 2 can variably control a current to be generated with an input command duty.

Note that, although the power generator 2 is only required to be a rotating electrical machine having a power-generating function, the power generator 2 is described as a power generator for ease of understanding in the following description.

An internal-combustion engine revolution speed detector 11 detects an internal-combustion engine the revolution speed, and is configured so as to detect the internal-combustion engine revolution speed, for example, by detecting a chipped tooth of a ring gear with a pickup sensor. A generated voltage detector 12 detects a generated voltage of the power generator 2. A generated current detector 13 detects a generated current of the power generator 2. For example, a hall element is provided in an electric power line connected to an output terminal of the power generator 2, and the generated current detector 13 detects a generated current through a hall effect of magneto-electric conversion.

Sections denoted by reference symbols 101 to 109 and M in FIG. 1 represent, for example, a control operation section formed of a computer including a memory section M and are respectively illustrated by functional blocks.

A power-generation mode determining section 101 determines a power-generation mode such as a power regeneration mode based on vehicle state information S1 such as an input state (pedal angle signal, etc.) of an accelerator pedal and a vehicle speed. A power-generation torque command calculating section 102 calculates a power-generation torque command to be given to the power generator 2 in accordance with the power-generation mode acquired in the power-generation mode determining section 101, and outputs the power-generation torque command to a power-generation torque command limiting section 103.

The power-generation torque command limiting section 103 limits the power-generation torque command acquired from the power-generation torque command calculating section 102 to limiting power-generation torque acquired from a limiting power-generation torque calculating section 109 or within a range of the limiting power-generation torque, and outputs estimated power-generation torque being limited power-generation torque to a command duty calculating section 104. In the case where the limitation is not necessary, the power-generation torque command directly becomes the estimated power-generation torque. The command duty calculating section 104 calculates, with reference to a map showing characteristics of the power generator 2 set in advance to the memory section M included in the control device, a command duty so as to achieve the estimated power-generation torque acquired from the power-generation torque command limiting section 103 based on the revolution speed of a power generator acquired from a power generator revolution speed estimating section 105 and the generated voltage acquired from the generated voltage detector 12. Then, the command duty calculating section 104 outputs the command duty to the power generator 2.

In this case, a first power generator characteristic map for the power generator 2 set in advance to the memory section M includes, for example, a map showing a value of a command duty for achieving intended power-generation torque (estimated power-generation torque) under each condition of a revolution speed and a generated voltage of the power generator.

The power generator revolution speed estimating section 105 estimates the revolution speed of the power generator by multiplying the revolution speed of the internal-combustion engine acquired from the internal-combustion engine revolution speed detector 11 by a ratio of diameters of the pulley 1a of the internal-combustion engine 1 and the pulley 2a of the power generator 2 set in advance to the memory section M included in the control device. A generated current estimating section 106 calculates, with reference to a map showing characteristics of the power generator 2 set in advance to the memory section M, an estimated generated current based on the generated voltage acquired from the generated voltage detector 12, the estimated power-generation torque acquired from the power-generation torque command limiting section 103, and the power generator revolution speed acquired from the power generator revolution speed estimating section 105.

In this case, a second power generator characteristic map for the power generator 2 set in advance to the memory section M includes, for example, a map showing a value of an estimated generated current under each condition of a revolution speed and a generated voltage of the power generator, and estimated power-generation torque.

An actual generated current acquiring section 107 acquires an actual generated current from the generated current detector 13. A generated current comparing section 108 compares the estimated generated current acquired from the generated current estimating section 106 with the actual generated current acquired from the actual generated current acquiring section 107, and determines that a generated current difference has occurred in the case where the actual generated current is smaller by a predetermined value or more compared to the estimated generated current. The predetermined value for determining the occurrence of the generated current difference is set to the memory section M by measuring in advance a change in current at a time of occurrence of a belt slip. In the case where the generated current comparing section 108 determines that the generated current difference has occurred (the belt slip has occurred), the limiting power-generation torque calculating section 109 outputs a value smaller by a predetermined value (subtracted value) than the estimated power-generation torque acquired from the power-generation torque command limiting section 103 to the power-generation torque command limiting section 103 as limiting power-generation torque. It is preferred that the predetermined value (subtracted value) be determined by the measurement performed in advance and be set so that rapid recovery is possible at a time of occurrence of the belt slip.

Figure 2:
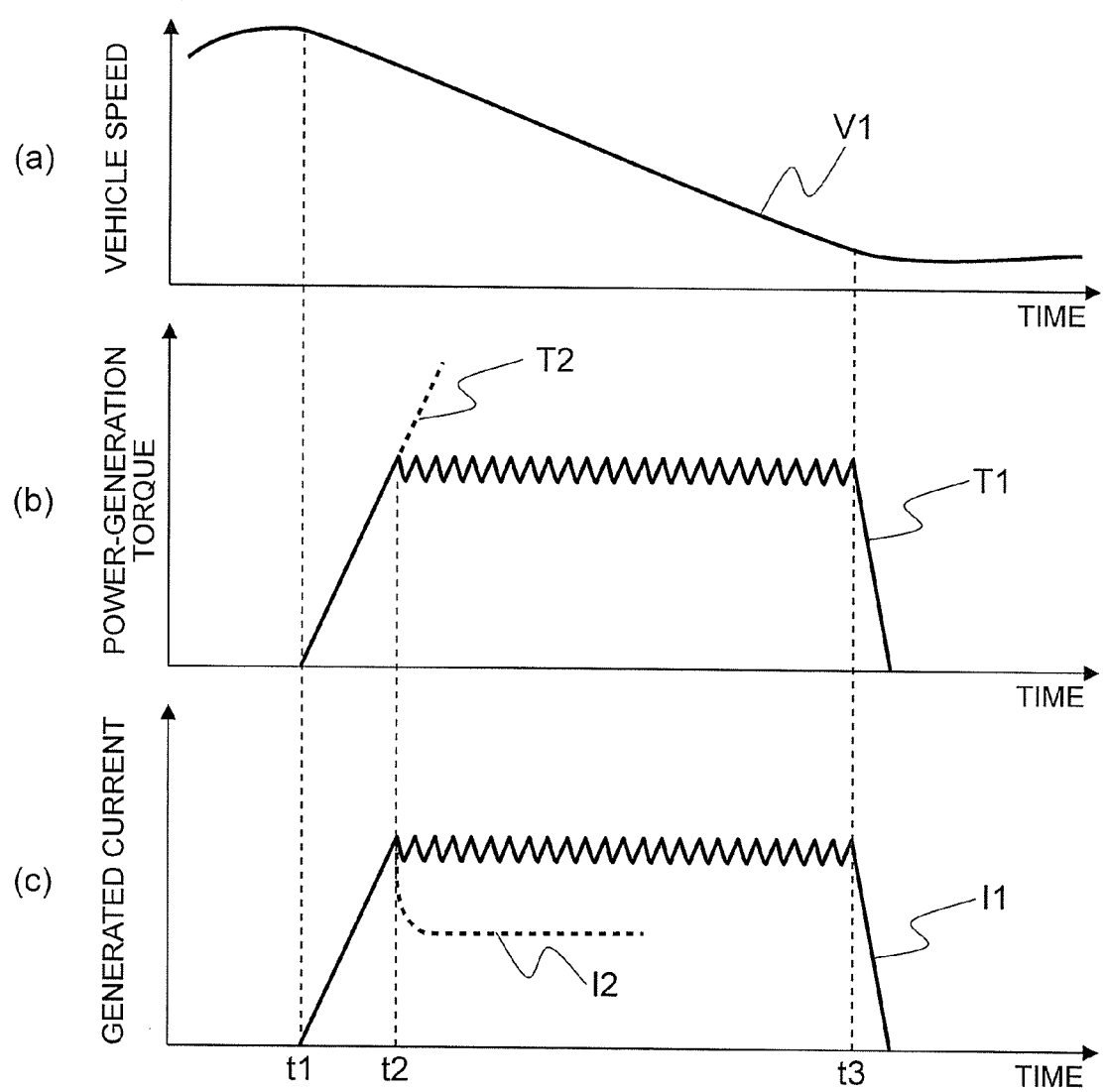
FIG. 2 is time chart illustrating behavior at a time of power generation in vehicle power-generation control according to a first embodiment of the present invention.

FIG. 2 is time chart illustrating behavior at a time of power generation in vehicle power-generation control according to the first embodiment of the present invention. A solid line V1 in (a) of FIG. 2 represents a vehicle speed; a solid line T1 in (b) of FIG. 2 represents power-generation torque of the power generator 2 in the case where the present invention is applied to power generation, and a dotted line T2 thereof represents power-generation torque in the case where the present invention is not applied thereto; and a solid line 11 in (c) of FIG. 2 represents a generated current of the power generator 2 in the case where the present invention is applied thereto, and a dotted line 12 thereof represents a generated current in the case where the present invention is not applied thereto.

In FIG. 2, at time t1, the vehicle is put in a reduced speed state and determined to be in the power regeneration mode, and a power-generation torque command is increased. At time t2, force applied to the drive belt 3 due to the power-generation torque exceeds the limit of grip to cause a microslip of the drive belt 3, and motive power is not sufficiently transmitted to the power generator 2, with the result that the actual generated current decreases. At this time, in the case where the present invention is not applied to power generation, the power-generation torque command increases as represented by the dotted line T2 in (b) of FIG. 2, but the actual generated current decreases greatly as represented by the dotted line 12 in (c) of FIG. 2.

In general, in the vehicle power-generation control device according to the first embodiment of the present invention, when a difference occurs between the estimated generated current and the actual generated current, recovery from the drive belt slip state is achieved by reducing the estimated power-generation torque being the power-generation torque command, and when the difference between the estimated generated current and the actual generated current is eliminated, the estimated power-generation torque is increased again. A drive belt slip occurrence period is shortened and a largest possible generated current is obtained by repeating the drive belt slip state and the recovery from the drive belt slip state as described above. At time t3, the reduced speed state of the vehicle is ended to complete the power regeneration mode. The estimated power-generation torque is reduced to decrease the actual generated current.

Figure 3:
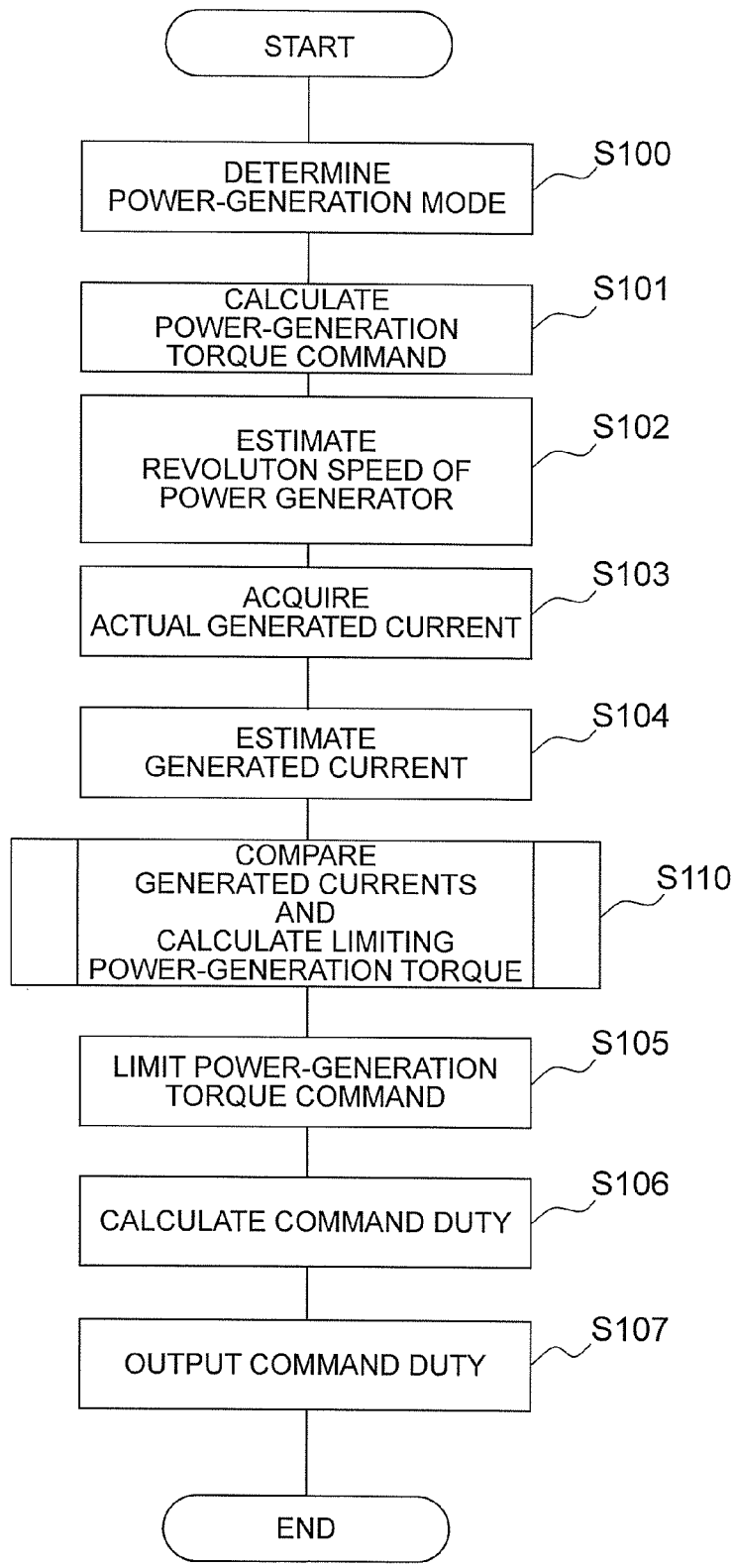
FIG. 3 is a flowchart illustrating processing of the vehicle power-generation control device according to the first embodiment of the present invention.

FIG. 3 is a flowchart illustrating a procedure of processing of calculating the command duty output to the power generator in the vehicle power-generation control device according to the first embodiment of the present invention. The procedure is performed at a predetermined operation period (for example, 5 msec).

In FIG. 3, in Step S100, the power-generation mode determining section 101 determines a power-generation mode such as a power regeneration mode based on the vehicle state information S1 such as an input state of an accelerator pedal and a vehicle speed, and the process proceeds to Step S101. In Step S101, the power-generation torque command calculating section 102 calculates the power-generation torque command based on the power-generation mode determined in Step S100, and the process proceeds to Step S102. For example, the power-generation torque command is increased in the case where the power-generation mode is the power regeneration mode, and the power-generation torque command is decreased to 0 in the case where the power-generation mode is not the power regeneration mode.

In Step S102, the power generator revolution speed estimating section 105 estimates the revolution speed of the power generator based on the revolution speed of the internal-combustion engine acquired from the internal-combustion engine revolution speed detector 11, and the process proceeds to Step S103. In Step S103, the generated current detector 13 and the actual generated current acquiring section 107 acquire the actual generated current of the power generator 2, and the process proceeds to Step S104. For example, the actual generated current acquiring section 107 acquires the actual generated current detected from the generated current detector 13 including a hall element as the actual generated current of the power generator 2.

In Step S104, the generated current estimating section 106 estimates, with reference to the second characteristic map of the power generator 2, the estimated generated current based on the generated voltage from the generated voltage detector 12, the revolution speed of the power generator from the power generator revolution speed estimating section 105 acquired in Step S102, and the estimated power-generation torque from the power-generation torque command limiting section 103 described later, and the process proceeds to Step S110.

In Step S110, the generated current comparing section 108 compares the actual generated current acquired in Step S103 with the estimated generated current acquired in Step S104, and detects the occurrence of a predetermined generated current difference (belt slip) from the comparison result. In the case where the belt slip has occurred, the limiting power-generation torque calculating section 109 further performs processing of calculating limiting power-generation torque obtained by subtracting a predetermined value from the estimated power-generation torque from the power-generation torque command limiting section 103 described later, and the process proceeds to Step S105. The contents of the processing in Step S110 are illustrated in FIG. 4 described later.

In Step S105, the power-generation torque command limiting section 103 limits the power-generation torque command calculated in Step S101 based on the limiting power-generation torque calculated in Step S110, and the process proceeds to Step S106. In Step S106, the command duty calculating section 104 calculates the command duty with reference to the first characteristic map of the power generator 2 based on the generated voltage and the revolution speed of the power generator estimated in Step S102 so as to achieve the estimated power-generation torque resulting from the limitation in Step S105, and the process proceeds to Step S107. In Step S107, the command duty calculated in Step S106 is output to the power generator 2, and the current processing is completed.

Figure 4:
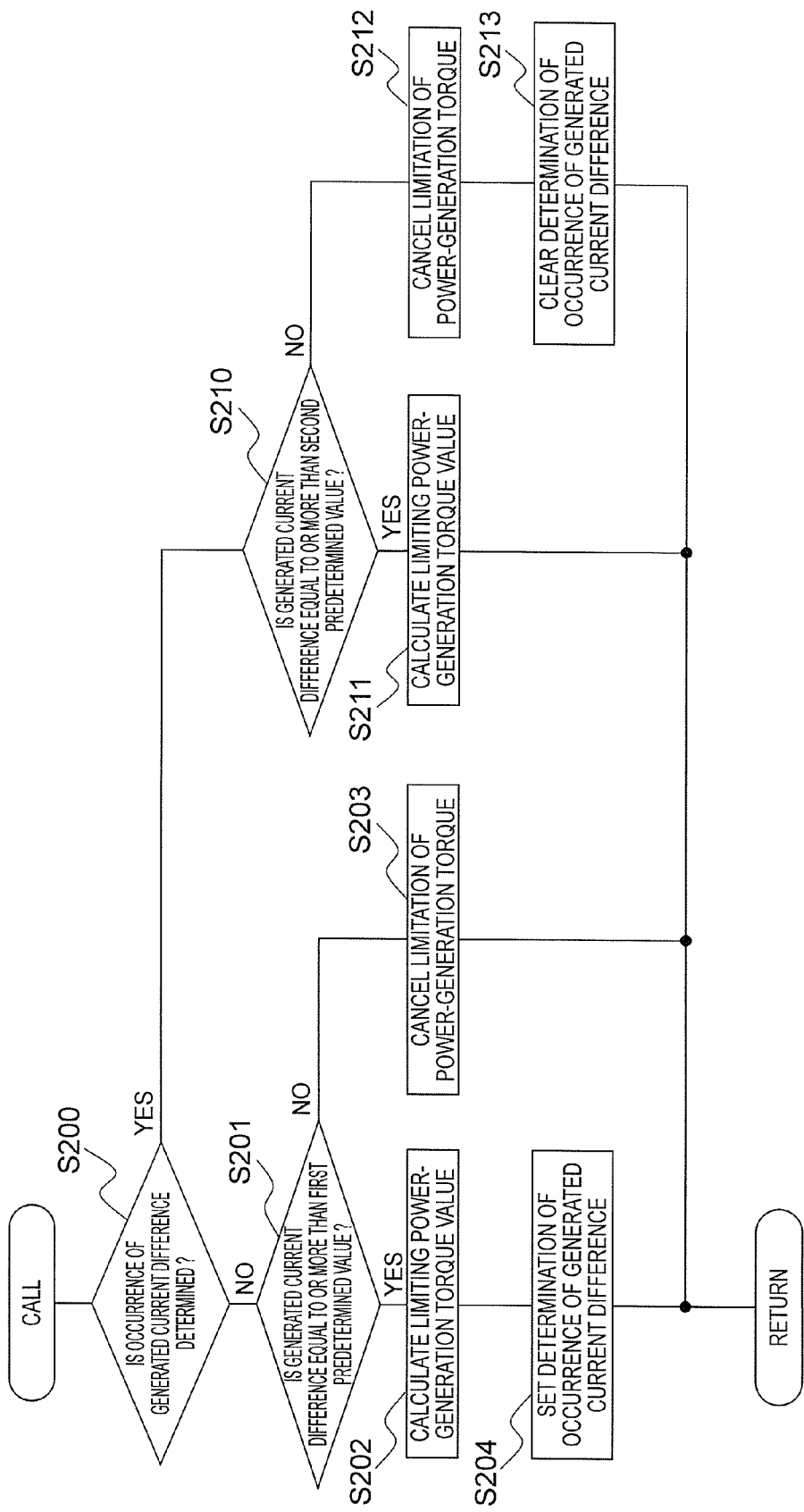
FIG. 4 is a flowchart illustrating processing of comparing generated currents and calculating limiting power-generation torque in the vehicle power-generation control device according to the first embodiment of the present invention.

FIG. 4 is a flowchart illustrating the processing of comparing the actual generated current with the estimated generated current and calculating the limiting power-generation torque in the generated current comparing section 108 and the limiting power-generation torque calculating section 109 in the vehicle power-generation control device according to the first embodiment of the present invention, and the processing is performed every time the processing is invoked in Step S110 in FIG. 3.

In FIG. 4, in Step S200, when the generated current comparing section 108 has not established the determination of the occurrence of the generated current difference, the process proceeds to Step S201, and when the generated current comparing section 108 has established the determination of the occurrence, that is, when the generated current difference has occurred, the process proceeds to Step S210. In Step S201, when the generated current comparing section 108 determines that the actual generated current is smaller by a first predetermined value or more than the estimated generated current (that is, the generated current difference is the first predetermined value or more), the process proceeds to Step S202, and otherwise, the process proceeds to Step S203. The first predetermined value can be calculated, for example, by measurement performed in advance based on a current difference at a time when slip occurs in the drive belt 3, and is set to 30 A or the like (for example, recorded to the memory section M).

In Step S202, the limiting power-generation torque calculating section 109 sets the limiting power-generation torque to a value smaller by a predetermined amount than the current estimated power-generation torque, and the process proceeds to Step S204.

The current estimated power-generation torque as used herein refers to estimated power-generation torque having a value of power-generation torque limited in the power-generation torque command limiting section 103 in the case where power generation is being limited, and refers to estimated power-generation torque having a value of a power-generation torque command which is not limited, that is, which is output from the power-generation torque command calculating section 102 in the case where power generation is not being limited.

Further, the value smaller by a predetermined value is set, for example, so as to decrease by 1 Nm per second. It is preferred that this value be determined by measurement performed in advance and set (for example, stored to the memory section M) so that the pulsation of the power-generation torque command becomes small. In Step S204, the limiting power-generation torque calculating section 109 establishes the determination of the occurrence of the generated current difference, and the current processing is completed. In Step S203, the limitation of the power-generation torque is cancelled, and the current processing is completed.

In Step S210, when the generated current comparing section 108 determines that the generated current difference between the actual generated current and the estimated generated current is larger by the second predetermined value or more during the limitation of the power generation, the process proceeds to Step S211, and otherwise, the process proceeds to Step S212. The second predetermined value is set to be a smaller value with respect to the first predetermined value, considering hysteresis, and set to, for example, 10 A. In Step S211, the limiting power-generation torque calculating section 109 sets the limiting power-generation torque to a value smaller by a predetermined amount than the current estimated power-generation torque, and the current processing is completed. In Step S212, the limiting power-generation torque calculating section 109 cancels the limitation of the power-generation torque, and the process proceeds to Step S213. In Step S213, it is determined that the determination of the occurrence of the generated current difference is not established, and the current processing is completed.

In the vehicle power-generation control device according to the first embodiment of the present invention as described above, in the case where the drive belt slips, recovery from the slip state can be achieved by reducing the estimated power-generation torque substantially being the power-generation torque command. Further, abnormal noise and wear of a mechanism due to the drive belt slip are reduced, and the power-generation amount can be obtained by utilizing the drive belt up to the vicinity of a slip limit.

Second Embodiment

In the vehicle power-generation control device according to the first embodiment described above, the occurrence of the drive belt slip is reduced by determining that the generated current difference has occurred in the case where the difference between the actual generated current and the estimated generated current reaches a predetermined value or more and limiting the power-generation torque command (estimated power-generation torque). In a vehicle power-generation control device according to a second embodiment of the present invention, it is determined that the generated current difference has occurred further based on an increase in difference between the actual generated current and the estimated generated current. Thus, the drive belt slip can be prevented more rapidly.

The configuration of a vehicle including the vehicle power-generation control device according to the second embodiment is the same as that of FIG. 1 except for the processing in the generated current comparing section 108 and the limiting power-generation torque calculating section 109. The procedure of the processing of calculating the command duty in the vehicle power-generation control device according to the second embodiment is different from the first embodiment in the contents of the processing of comparing the actual generated current with the estimated generated current and calculating the limiting power-generation torque in Step S110 illustrated in FIG. 3.

Figure 5:
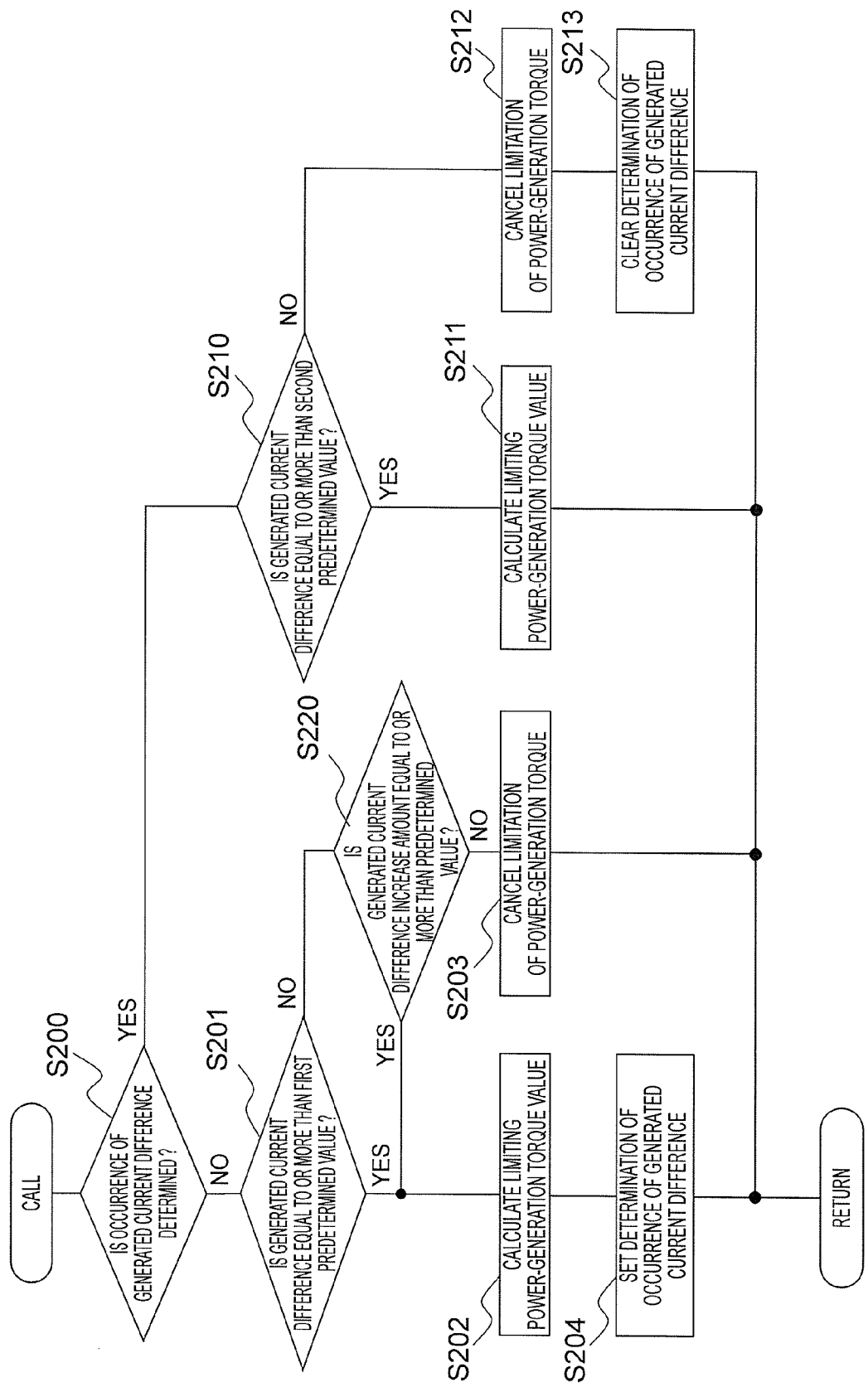
FIG. 5 is a flowchart illustrating processing of comparing generated currents and calculating limiting power-generation torque in a vehicle power-generation control device according to a second embodiment of the present invention.

Now, the difference from the first embodiment is described with reference of a flowchart illustrating the processing of comparing the actual generated current with the estimated generated current and calculating the limiting power-generation torque in the vehicle power-generation control device according to the second embodiment illustrated in FIG. 5. In FIG. 5, portions for performing the same processing as that in the flowchart illustrated in FIG. 4 of the first embodiment are denoted by the same reference symbols as those therein, and the processing of different portions is described below.

In FIG. 5, in Step S201, when the generated current comparing section 108 determines that the actual generated current is smaller by a first predetermined value or more than the estimated generated current, the process proceeds to Step S202, and otherwise, the process proceeds to Step S220. In Step S220, in the case where a difference of the actual generated current with respect to the estimated generated current has increased by a predetermined value or more, the process proceeds to Step S202, and otherwise, the process proceeds to Step S203. For example, it is determined that the generated current difference has occurred in the case where the difference between the actual generated current and the estimated generated current has increased by 10 A during 100 msec. In this case, it is determined whether or not the limitation of the power-generation torque is performed in accordance with an increase rate of the difference of the actual generated current with respect to the estimated generated current. Further, as needed, each generated current difference of the actual generated current with respect to the estimated generated current may be recorded in the memory section M so as to be used for calculating the increase rate.

In the vehicle power-generation control device according to the second embodiment of the present invention as described above, it is determined that the generated current difference has occurred more rapidly compared to the vehicle power-generation control device according to the first embodiment, and hence abnormal noise and wear of a mechanism due to the drive belt slip can be reduced.

Third Embodiment

In the vehicle power-generation control device according to each of the above-mentioned embodiments, in the case where it is determined that the generated current difference has occurred based on the difference between the actual generated current and the estimated generated current, rapid recovery from the slip state of the drive belt is achieved by limiting the power-generation torque command (estimated power-generation torque). In contrast, in a vehicle power-generation control device according to a third embodiment of the present invention, the occurrence of the drive belt slip is prevented in advance by setting initial limiting power-generation torque based on the tension of the drive belt.

Now, the process of deriving a relationship between the tension of the drive belt and the slip limit torque is described. Note that, calculation is conducted herein assuming that the tension of the drive belt is sufficiently large, and the centrifugal force involved in the rotation of the drive belt can be ignored.

Figure 6:
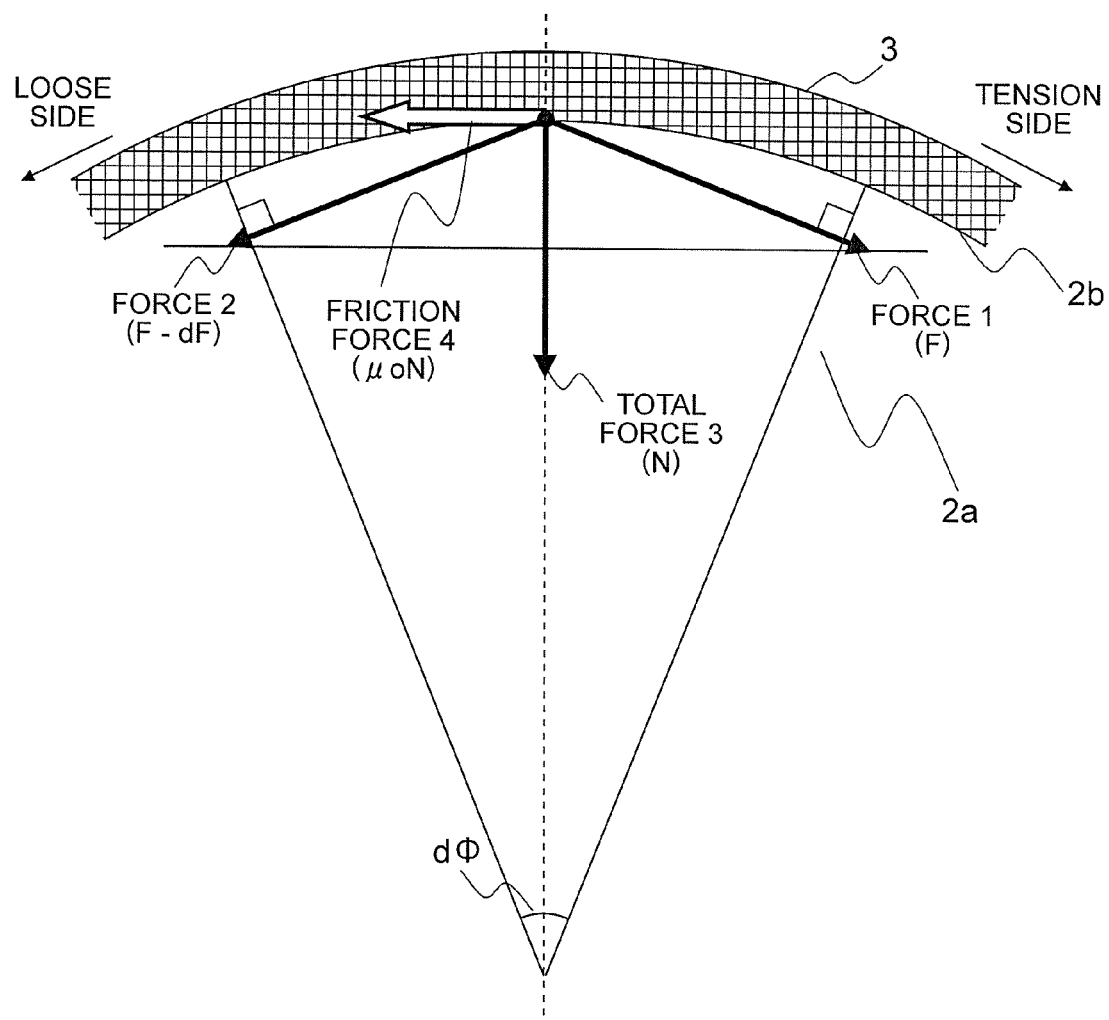
FIG. 6 is a diagram illustrating force applied to a drive belt in a vehicle power-generation control device according to a third embodiment of the present invention.

FIG. 6 is a diagram illustrating force applied to a portion with a small angle $d\phi$ of the drive belt 3 tensioned on the pulley 2a of the power generator 2. A relationship among additional torque Tlim being the belt slip limit, a static friction coefficient $\mu_0$, belt tension Fs, and an effective winding angle $\theta$ of the pulley 2a of the drive belt 3 is determined based on FIG. 6. In FIG. 6, force 1 represents tension F on a belt tension side; force 2 represents tension F−dF on a belt loose side; total force 3 represents force N applied in a normal direction of a pulley contact surface 2b; and friction force 4 represents friction force $\mu_0 N$ generated due to the total force 3. In this case, the force in the normal direction of the pulley contract surface 2b is determined by Expression (1).

$$N = F \times \sin(d\varphi/2) + (F - dF) \times \sin(d\varphi/2) \quad (1)$$
$$= 2F \times \sin(d\varphi/2) - dF \times \sin(d\varphi/2)$$

When it is assumed that $d\phi$ and $dF$ are minute, Expression (1) can be approximated to $\sin(d\phi/2) \approx d\phi/2$ to obtain Expression (2).

$$N \approx F d\phi \quad (2)$$

Thus, Expression (3) is obtained from the maximum static friction coefficient.

$$\mu_0 N = \mu_0 F d\phi \quad (3)$$

Further, Expression (4) is obtained from the balance of force in a belt winding direction.

$$F \times \cos(d\phi/2) = (F - dF) \times \cos(d\phi/2) + \mu_0 F d\phi \quad (4)$$

Assuming that $d\phi$ is minute in Expression (4), Expression (4) can be approximated to $\cos(d\phi/2) \approx 1$ to obtain Expression (5).

$$d\phi = dF/(\mu_0 F) \quad (5)$$

A relationship of Expression (6) can be obtained by integrating Expression (5).

$$\phi = (1/\mu_0)\ln F - (1/\mu_0)\ln Fs \quad (6)$$

Expression (7) is obtained by modifying Expression (6).

$$F(\phi) = Fs \times \exp(\mu_0 \phi) \quad (7)$$

Expression (8) is obtained by integrating Expression (7) at the effective winding angle $\theta$.

$$S(\text{Integral})_0^\theta F(\varphi) d\varphi = S(\text{Integral})_0^\theta Fs \times \exp(\mu_0 \varphi) d\varphi \quad (8)$$
$$= (Fs/\mu_0)\{\exp(\mu_0 \theta) - 1\}$$

When the force in a belt tension direction exceeds a value represented by Expression (8), a drive belt slip occurs. That is, the condition under which the drive belt 3 does not slip is represented by Expression (9).

$$T\lim \leq (R \times Fs/\mu_0)\{\exp(\mu_0 \theta) - 1\} \quad (9)$$

In Expression (9), R represents a radius of the pulley 2a of the power generator 2.

As described above, the power-generation torque at which the drive belt 3 slips is proportional to the tension of the drive belt 3. Therefore, the limiting power-generation torque calculating section 109 sets the initial limiting power-generation torque based on the tension of a standard drive belt to be set at a time of maintenance. For example, the tension of the standard drive belt set at the time of maintenance is input from an input section (not shown) and set in the memory section M. The limiting power-generation torque calculating section 109 reads the set tension of the standard drive belt from the memory section M. Further, based on the slip occurrence power-generation torque calculated from a proportional relation (which may be stored in the memory section M) between the slip occurrence power-generation torque and the tension of the drive belt, the limiting power-generation torque calculating section 109 sets power-generation torque, for example, which is equal to or less than the slip occurrence power-generation torque, which has a predetermined ratio with respect to the slip occurrence power-generation torque, and which is in the vicinity of the slip occurrence power-generation torque, as the initial limiting power-generation torque. As a result, the power-generation torque command limiting section 103 limits the power-generation torque command within a range of the initial limiting power-generation torque, and outputs the limited estimated power-generation torque.

Further, the initial limiting power-generation torque may be corrected based on the drive belt tension detected by a drive belt tension detector 18 including a strain gauge illustrated in FIG. 1. Further, considering that a sliding property of the belt varies depending on temperature, the initial limiting power-generation torque may be corrected based on external temperature detected by an external temperature detector 19 and the like. The relationship between the external temperature and the initial limiting power-generation torque can be determined by actually measuring in advance the relationship between the estimated power-generation torque (power-generation torque) at the time of occurrence of the belt slip and the external temperature. The determined power-generation torque-external temperature characteristic map is set in the memory section M to be used.

In the vehicle power-generation control device according to the third embodiment of the present invention as described above, the drive belt slip can be prevented in advance and the occurrence of abnormal noise and wear of a mechanism due to the drive belt slip can be reduced by appropriately limiting the power-generation torque based on the tension of the drive belt. Further, in the case where the tension of the belt is decreased or in the case where the static friction coefficient of the drive belt in a low-temperature environment is decreased, the drive belt slip can also be prevented by appropriately limiting the power-generation torque.

Fourth Embodiment

In the vehicle power-generation control device according to each of the above-mentioned first and second embodiments, in the case where it is determined that the generated current difference has occurred based on the difference between the actual generated current and the estimated generated current, rapid recovery from the slip state of the drive belt can be achieved by limiting the power-generation torque command (estimated power-generation torque). In a fourth embodiment of the present invention, the recurrence of the drive belt slip is prevented further by calculating the limiting power-generation torque based on a value of the power-generation torque command (estimated power-generation torque) at a time of occurrence of the difference between the actual generated current and the estimated generated current.

The configuration of a vehicle including the vehicle power-generation control device according to the fourth embodiment is the same as that of the block diagram of FIG. 1 except for the processing in the generated current comparing section 108 and the limiting power-generation torque calculating section 109. The procedure of the processing of calculating the command duty in the vehicle power-generation control device according to the fourth embodiment is different from the first and second embodiments in the contents of the processing of comparing the actual generated current with the estimated generated current and calculating the limiting power-generation torque in Step S110 illustrated in FIG. 3.

Figure 7:
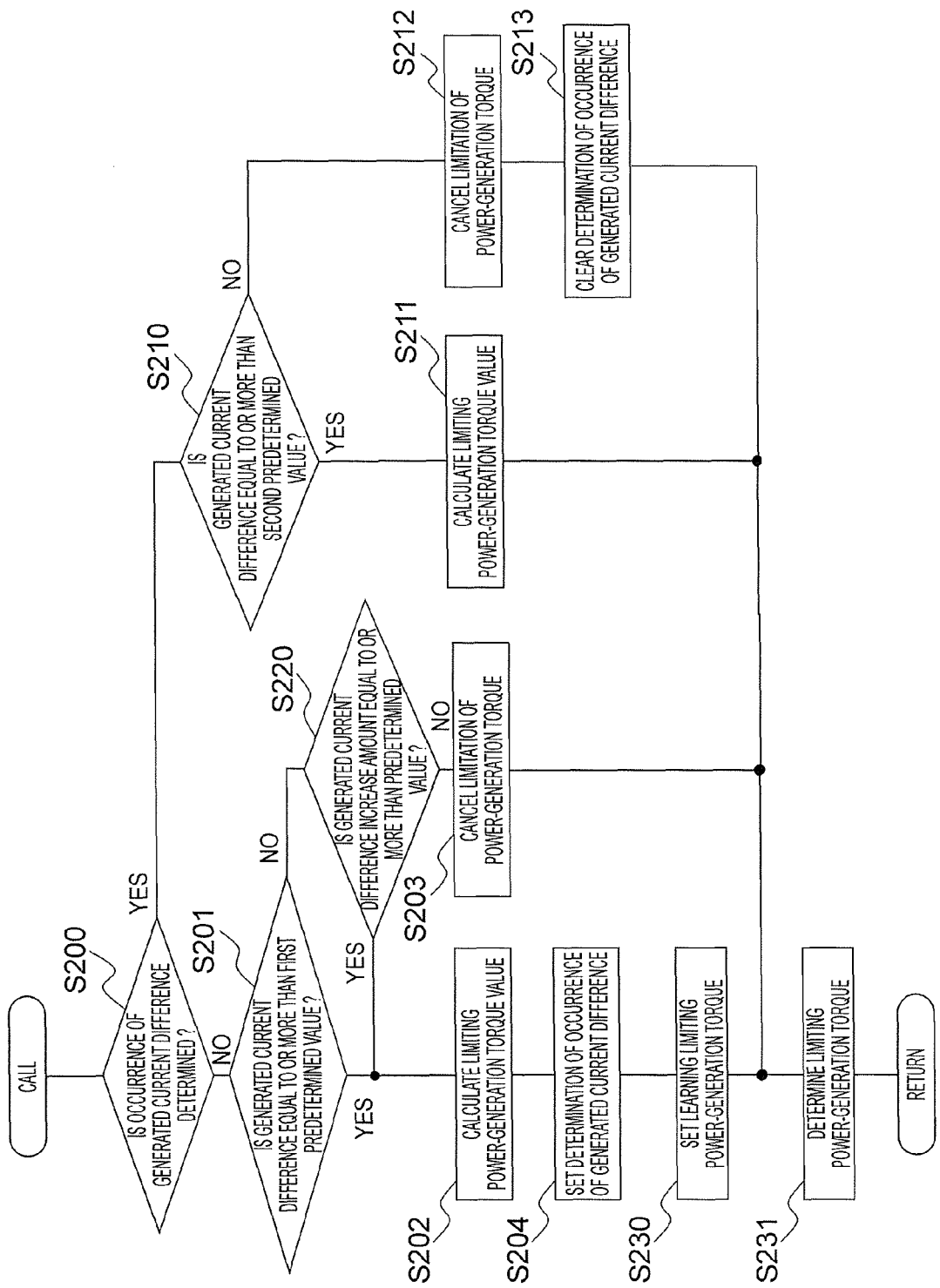
FIG. 7 is a flowchart illustrating processing of comparing generated currents and calculating limiting power-generation torque in a vehicle power-generation control device according to a fourth embodiment of the present invention.

Now, the difference from the second embodiment is described. FIG. 7 is a flowchart illustrating the processing of comparing the actual generated current with the estimated generated current and calculating the limiting power-generation torque in the vehicle power-generation control device according to the fourth embodiment. In FIG. 7, portions for performing the same processing as that in the flowchart illustrated in FIG. 5 of the second embodiment are denoted by the same reference symbols as those therein, and the processing of different portions is described below.

In FIG. 7, in Step S204, the limiting power-generation torque calculating section 109 establishes the determination of the occurrence of the generated current difference, and the process proceeds to Step S230. In Step S203, the limitation of the power-generation torque is cancelled, and the process proceeds to Step S231. In Step S211, the limiting power-generation torque is set to be a value smaller by a predetermined amount than the current estimated power-generation torque, and the process proceeds to Step S231. In Step S213, the determination of the occurrence of the generated current difference is not established, and the process proceeds to Step S231.

In Step S230, the limiting power-generation torque calculating section 109 sets learning limiting power-generation torque based on a value of the current estimated power-generation torque, that is, the estimated power-generation torque during the occurrence of the generated current difference, and the process proceeds to Step S231. In Step S231, the learning limiting power-generation torque or the limiting power-generation torque which is smaller is determined to be the limiting power-generation torque, and the current processing is completed.

Figure 8:
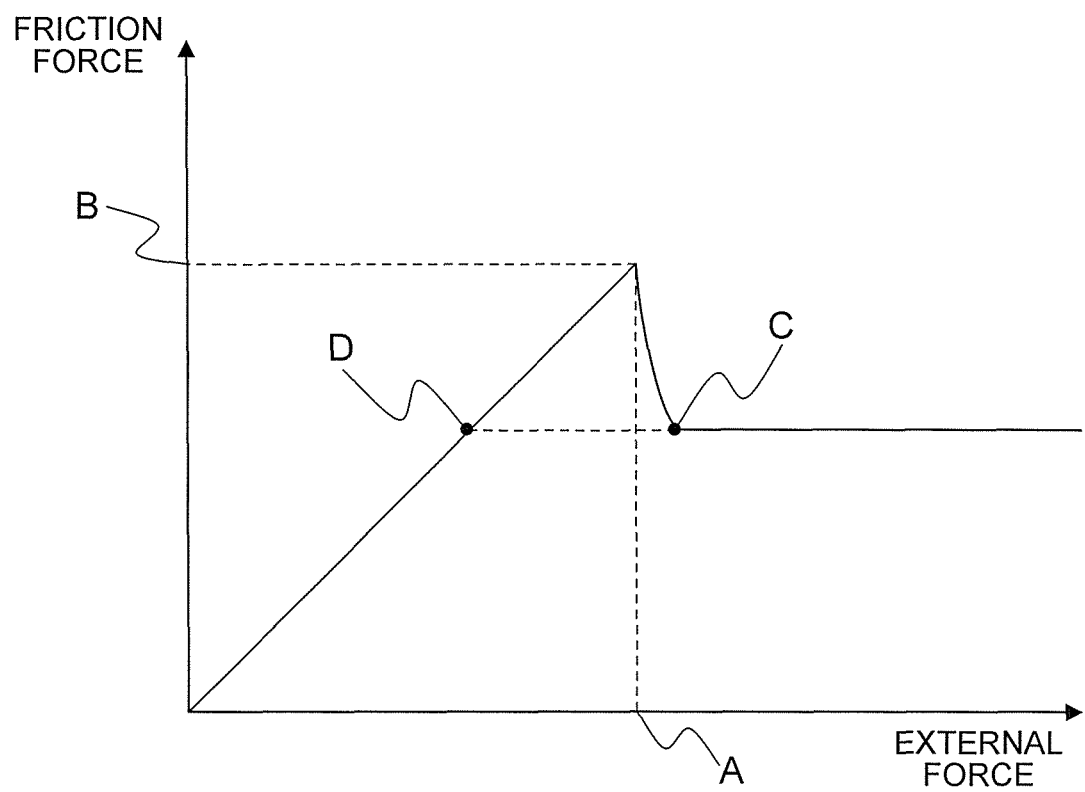
FIG. 8 is a graph showing external force and a limit of friction force in the vehicle power-generation control device according to the fourth embodiment of the present invention.

FIG. 8 is a graph showing a relationship between external force and friction force applied to the drive belt 3, illustrating an operation of the vehicle power-generation control device according to the fourth embodiment. In FIG. 8, a point A represents the external force of the slip limit of the drive belt 3, and a slip does not occur in the drive belt 3 until the external force reaches the point A. When the external force exceeds the point A, the drive belt 3 is put in a slip state, and the friction force of the drive belt 3 is controlled by a dynamic friction coefficient. A point B represents a maximum value of static friction force. A point C represents a point where friction force becomes steady even when the external force is increased after the drive belt 3 slips. The point C is determined by the dynamic friction coefficient. A point D represents the friction force and the external force at a time when, after the drive belt 3 slips with the external force represented by the point C, a slip is restored when the external force is reduced.

The vehicle power-generation control device according to the fourth embodiment is configured to set the learning limiting power-generation torque to a value which is smaller than and is in the vicinity of the slip limit represented by the point A in FIG. 8. In this case, when the learning limiting power-generation torque is set based on the external force at the point D where the slip is restored by reducing the external force, the learning limiting power-generation torque cannot be set in the vicinity of the slip limit of the drive belt 3 represented by the point A in FIG. 8. Therefore, the range of the slip limit of the drive belt 3 cannot be fully utilized, and a power-generation amount to be obtained is decreased.

Specifically, based on the estimated power-generation torque (=slip occurrence power-generation torque) at the time of occurrence of the generated current difference, the limiting power-generation torque calculating section 109 sets, as the learning limiting power-generation torque, for example, power-generation torque equal to or less than the estimated power-generation torque (point A in FIG. 8), which is in the vicinity of the estimated power-generation torque and has a predetermined ratio with respect to the estimated power-generation torque. As a result, the power-generation torque command limiting section 103 limits the power-generation torque command in a range of the learning limiting power-generation torque.

Figure 9:
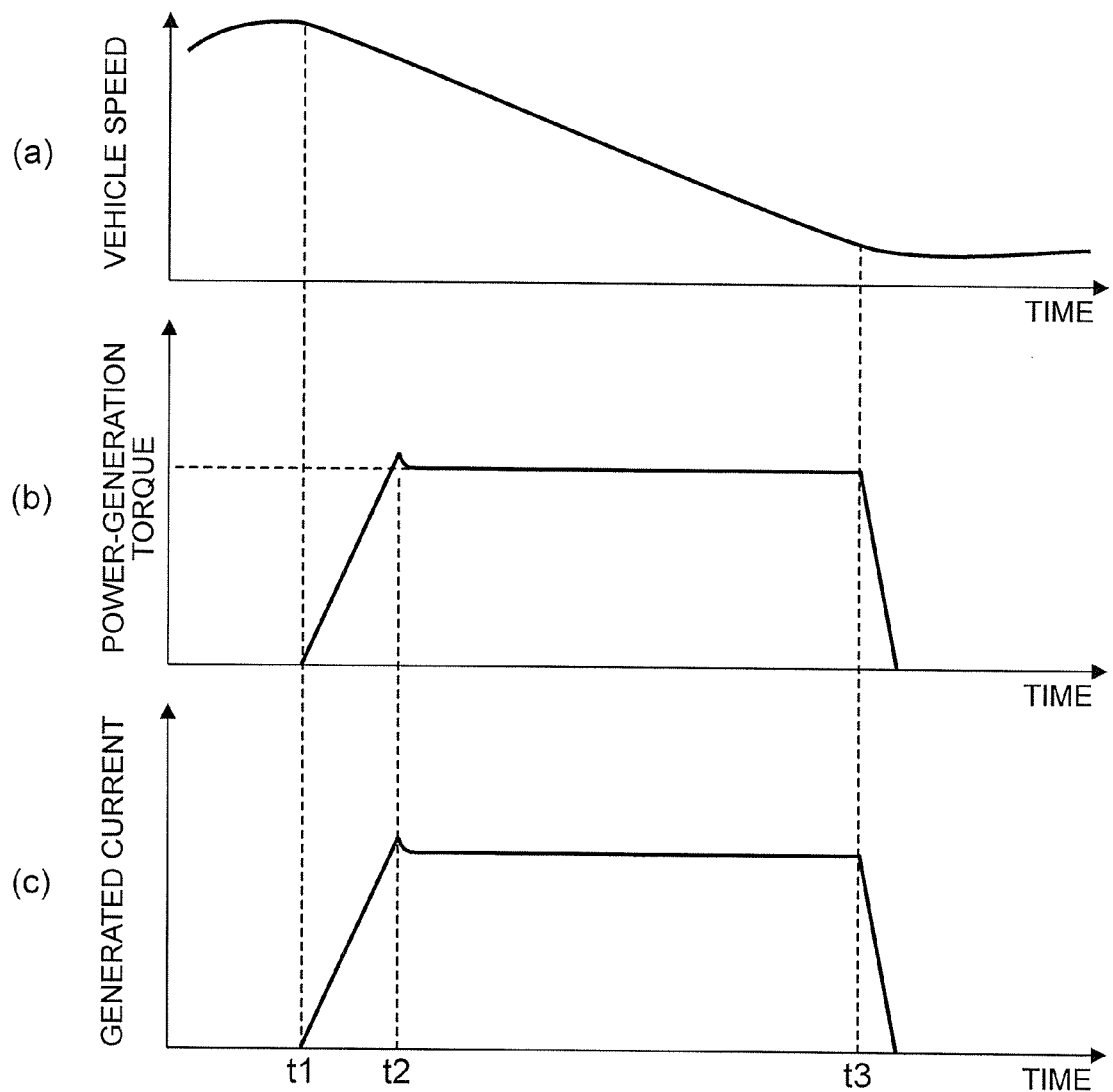
FIG. 9 are time charts illustrating behavior at a time of power generation in the vehicle power-generation control device according to the fourth embodiment of the present invention.

FIG. 9 are time charts illustrating behavior at a time of power generation in the vehicle power-generation control device according to the fourth embodiment of the present invention. (a) of FIG. 9 represents a vehicle speed, (b) of FIG. 9 represents power-generation torque, and (c) of FIG. 9 represents a generated current. At time t2, force applied to the drive belt 3 due to the power-generation torque once exceeds the limit of grip to cause a micro-slip of the drive belt 3, and motive power is not sufficiently transmitted to the power generator 2, with the result that an actual generated current almost decreases. However, by setting, as the learning limiting power-generation torque, power-generation torque equal to or less than the estimated power-generation torque at time t2 (that is, power-generation torque at a time of occurrence of the slip), which is in the vicinity of the estimated power-generation torque and has a predetermined ratio with respect to the estimated power-generation torque, and limiting the power-generation torque command with the learning limiting power-generation torque, the micro-slip does not occur in the drive belt 3 after time t2, and the power-generation torque and the generated current can be maintained at a high level as illustrated in FIGS. 9(*b*) and 9(*c*).

In the vehicle power-generation control device according to the fourth embodiment of the present invention as described above, the recurrence of the drive belt slip can be prevented, and the generated current can be obtained up to the vicinity of the slip limit of the drive belt by calculating the limiting power-generation torque based on a value of the estimated power-generation torque at the time when the difference between the actual generated current and the estimated generated current occurs. Thus, even in the case where friction force of the drive belt is decreased in a tendency manner due to degradation of the drive belt with passage of time, the recurrence of the drive belt slip can be appropriately prevented, and the occurrence of abnormal noise and wear of a mechanism can be prevented.

Fifth Embodiment

In the vehicle power-generation control device according to the fourth embodiment as described above, the recurrence of a slip of the drive belt 3 is prevented by calculating the limiting power-generation torque based on a value of the estimated power-generation torque output from the power-generation torque command limiting section 103 at the time when the difference between the actual generated current and the estimated generated current has occurred. In a vehicle power-generation control device according to a fifth embodiment of the present invention, the power-generation torque command (estimated power-generation torque) is the learning limiting power-generation torque, and a time period during which the difference between the actual generated current and the estimated generated current has not occurred is integrated. When the integrated time period reaches a predetermined time period or more, the learning limiting power-generation torque is corrected so as to increase.

The configuration of a vehicle including the vehicle power-generation control device according to the fifth embodiment is the same as that of FIG. 1 except for the processing in the generated current comparing section 108 and the limiting power-generation torque calculating section 109. The procedure of the processing of calculating the command duty in the vehicle power-generation control device according to the fifth embodiment is different from the fourth embodiment in the contents of the processing of comparing the actual generated current with the estimated generated current and calculating the limiting power-generation torque in Step S110 illustrated in FIG. 3.

Figure 10:
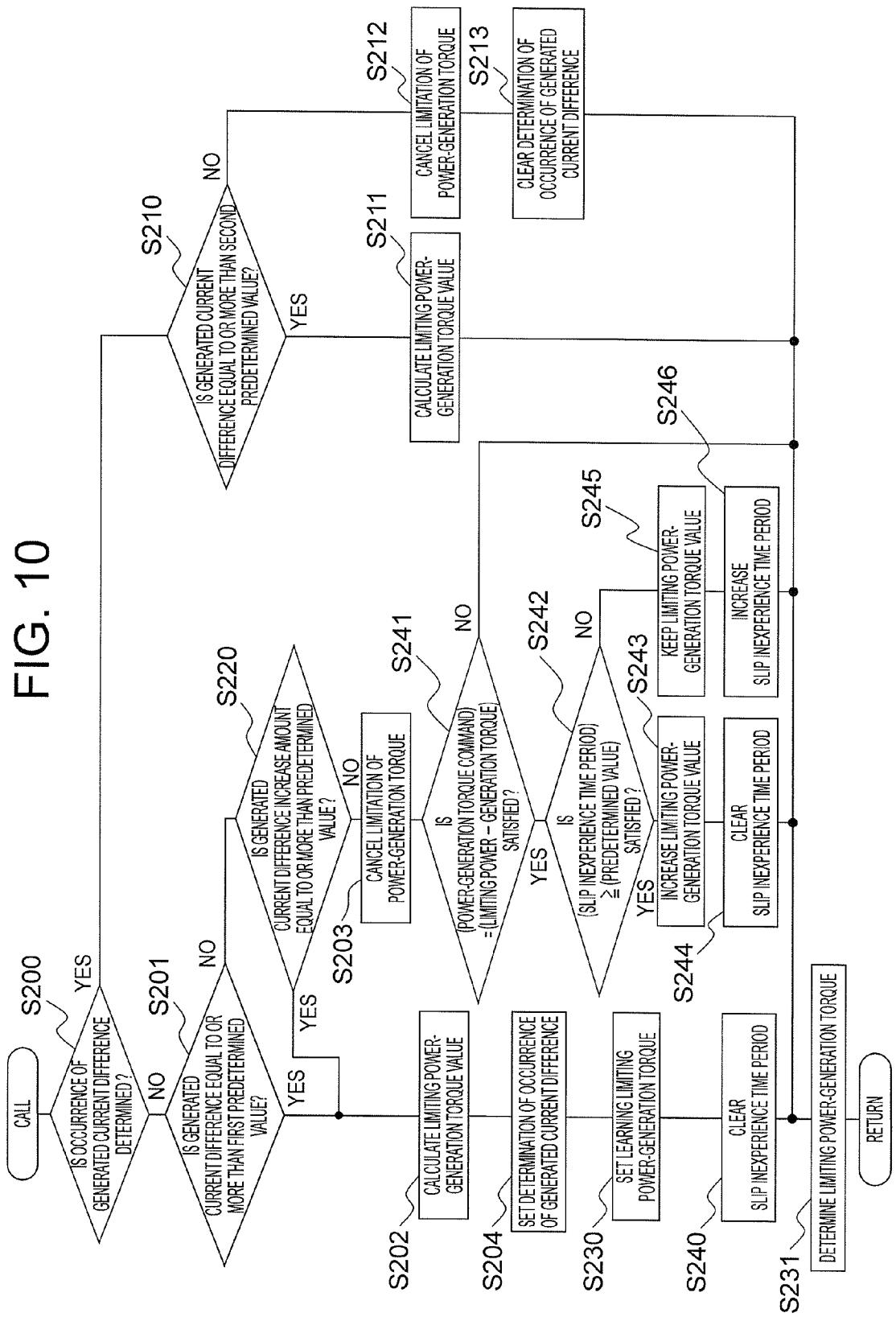
FIG. 10 is a flowchart illustrating processing of comparing generated currents and calculating limiting power-generation torque in a vehicle power-generation control device according to a fifth embodiment of the present invention.

Now, the difference from the fourth embodiment is described with reference of a flowchart illustrating the processing of comparing the actual generated current with the estimated generated current and calculating the limiting power-generation torque in the vehicle power-generation control device according to the fifth embodiment illustrated in FIG. 10. In FIG. 10, portions for performing the same processing as that in the flowchart illustrated in FIG. 7 of the fourth embodiment are denoted by the same reference symbols as those therein, and the processing of different portions is described below.

In FIG. 10, in Step S230, the limiting power-generation torque calculating section 109 sets the learning limiting power-generation torque based on a value of the current estimated power-generation torque, that is, the estimated power-generation torque during the occurrence of the generated current difference, and the process proceeds to Step S240. In Step S203, the limitation of the power-generation torque is cancelled, and the process proceeds to Step S241.

In Step S240, the limiting power-generation toque calculating section 109 clears the slip inexperience time period to a O-value, and the process proceeds to Step S231. In Step S241, it is determined whether or not the power-generation torque command (in this case, the estimated power-generation torque) is matched with the limiting power-generation torque or the learning limiting power-generation torque. In the case where the estimated power-generation torque is matched with the limiting power-generation torque or the learning limiting power-generation torque, the process proceeds to Step S242. Otherwise, the process proceeds to Step S231. In Step S242, it is determined whether or not the slip inexperience time period (generated current difference inexperience integrated time period) reaches a predetermined value or more. In the case where the slip inexperience time period reaches the predetermined value or more, the process proceeds to Step S243, and otherwise, the process proceeds to Step S245. The predetermined value is set based on a time period for performing power generation with one power regeneration and set to about 15 seconds.

In Step S243, the learning limiting power-generation torque set in Step S230 is increased by a predetermined amount, and the process proceeds to Step S244. The predetermined amount is preferred to be set so as not to give uncomfortable feeling to a driver due to a change given to deceleration of the vehicle. For example, the predetermined amount is set so as not to cause a change of 0.001 G due to an increase in power-generation torque and is set to about 0.2 Nm considering a design value of the vehicle such as a final deceleration ratio, a tire diameter, and a pulley ratio. In Step S244, the slip inexperience time period is cleared to a O-value, and the process proceeds to Step S231. In Step S245, the process proceeds to Step S246 while keeping the learning limiting power-generation torque value. In Step S246, a processing period (for example 5 msec which is the same as that of FIG. 3) of processing illustrated in FIG. 10 is added to the slip inexperience time period to integrate the slip inexperience time period, and the process proceeds to Step S231.

In the vehicle power-generation control device according to the fifth embodiment of the present invention as described above, for example, even in the case where the learning limiting power-generation torque is learned in an underestimated manner due to a belt slip which has occurred due to a transient factor such as splash of water on the drive belt in the vehicle power-generation control device according to the fourth embodiment, a power-generation amount can be ensured reliably by gradually increasing the learning limiting power-generation torque while checking the absence of the drive belt slip so as to bring the learning limiting power-generation torque close to a value of the power-generation torque corresponding to a value of the slip limit of the drive belt at a normal time.

Sixth Embodiment

Figure 11:
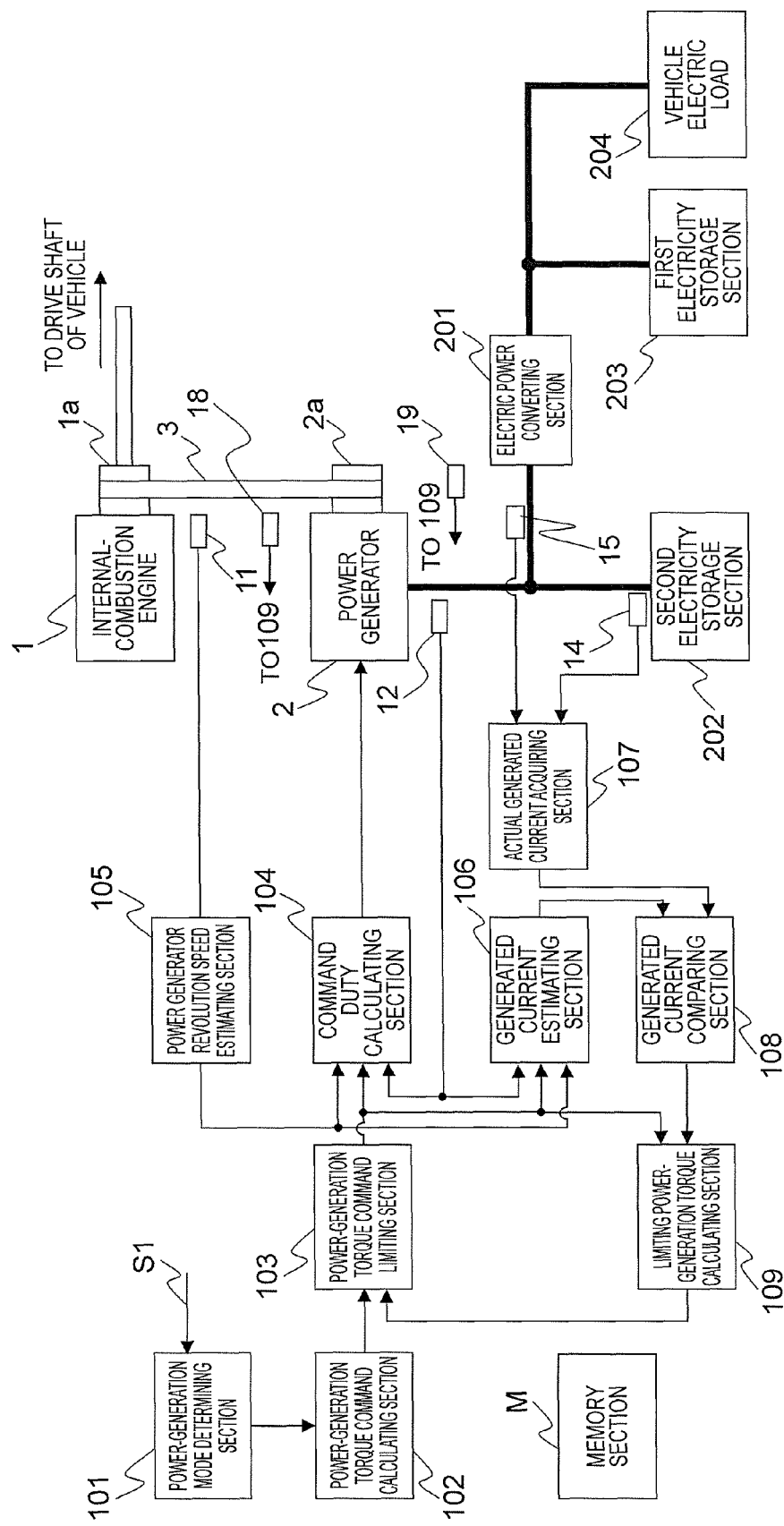
FIG. 11 is a block diagram of a vehicle including a vehicle power-generation control device according to a sixth embodiment of the present invention.

In the vehicle power-generation control device according to each of the above-mentioned embodiments, the actual generated current detected by the generated current detector provided in the power generator is obtained. However, in a vehicle power-generation control device according to a sixth embodiment of the present invention, the actual generated current of the power generator is estimated based on the sum of current values obtained by current detectors provided in an electric power converting section and a second electricity storage section to which electric power generated by the power generator is supplied, in place of the generated current detector provided in the power generator, in a vehicle having a configuration as illustrated in FIG. 11 so as to increase the recovery amount of electric power generated by power regeneration. The electric power converting section generally includes a current detector for converting input/output electric power. The second electricity storage section is, for example, a lithium ion battery, and generally includes a current detector for grasping a charged state for the purpose of protecting the lithium ion battery.

FIG. 11 is a block diagram of a vehicle including the vehicle power-generation control device according to the sixth embodiment of the present invention. In FIG. 11, sections having the same configurations as those in the block diagram of the vehicle including the vehicle power-generation control device according to each of the above-mentioned embodiments illustrated in FIG. 1 are denoted by the same reference symbols as those therein, and configurations of different sections are described below.

The power generator 2 supplies generated electric power to an electric power converting section 201 and a second electricity storage section 202. The electric power converting section 201 converts electric power supplied from at least one of the power generator 2 or the second electricity storage section 202 and outputs the converted electric power. The second electricity storage section 202 stores the electric power generated by the power generator 2 and supplies the stored electric power to the electric power converting section 201. A first electricity storage section 203 stores electric power output from the electric power converting section 201 and supplies the stored electric power to a vehicle electric load 204. The vehicle electric load 204 is a vehicle electric load such as a headlight, and realizes each function by consuming electric power.

An electric power converting section input current detector 15 is provided to the electric power converting section 201. The electric power converting section input current detector 15 detects an electric power converting section input current that is input to the electric power converting section 201 and transmits the electric power converting section input current to the actual generated current acquiring section 107. A second electricity storage section charged current detector 14 is provided to the second electricity storage section 202. The second electricity storage section charged current detector 14 detects a second electricity storage section charged current that is charged in the second electricity storage section 202 and transmits the second electricity storage section charged current to the actual generated current acquiring section 107. In this case, the second electricity storage section charged current detector 14 transmits a current discharged from the second electricity storage section 202 as a negative value. The actual generated current acquiring section 107 estimates the actual generated current of the power generator 2 by adding up the electric power converting section input current and the second electricity storage section charged current, and outputs the estimated actual generated current to the generated current comparing section 108.

In the vehicle power-generation control device according to the sixth embodiment of the present invention as described above, the current detector provided to the power generator can be eliminated by estimating the actual generated current with use of the current detectors provided to the electric power converting section and the second electricity storage section in place of the current detector provided to the power generator. It is not necessary to provide the generated current detector of the power generator by using the electric power converting section input current detector and the second electricity storage section charged current detector provided so as to increase a recovery amount of electric power generated by power regeneration, and hence cost does not increase.

Note that, the internal-combustion engine revolution speed detector 11 and the power generator revolution speed estimating section 105 constitute a rotating electrical machine revolution speed acquiring section. The generated voltage detector 12 constitutes a rotating electrical machine voltage detecting section. The generated current detector 13, the electricity storage section charged current detector 14, the electric power converting section input current detector 15, and the actual generated current acquiring section 107 constitute a rotating electrical machine current detecting section. The power-generation mode determining section 101 and the power-generation torque command calculating section 102 constitute a power-generation torque command generating section. The generated current comparing section 108 and the limiting power-generation torque calculating section 109 constitute a generated current difference determining section. The power-generation torque command limiting section 103 and the command duty calculating section 104 constitute a power-generation control section. The drive belt tension detector 18 constitutes a drive belt tension detecting section. The external temperature detector 19 constitutes an external temperature detecting section.

Further, the present invention is not limited to each of the above-mentioned embodiments, and needless to say, the present invention includes all the possible combinations of those embodiments.

INDUSTRIAL APPLICABILITY

The vehicle power-generation control device and control method therefor according to the present invention are applicable to various kinds of vehicles on which a rotating electrical machine having a power regeneration mechanism is mounted.

The invention claimed is:

1. A vehicle power-generation control device for a vehicle including:
   an internal-combustion engine for giving and receiving motive power with respect to a drive shaft of the vehicle; and
   a rotating electrical machine for giving and receiving motive power with respect to the internal-combustion engine through a drive belt, the rotating electrical machine being subjected to variable output control,
   the vehicle power-generation control device comprising:
   a rotating electrical machine revolution speed acquiring section for determining a revolution speed of the rotating electrical machine;
   a rotating electrical machine voltage detecting section for detecting a voltage of the rotating electrical machine;
   a rotating electrical machine current detecting section for determining an actual current of the rotating electrical machine;
   a power-generation torque command generating section for calculating a power-generation torque command for the rotating electrical machine based on a state of the vehicle;
   a generated current estimating section for estimating a rotating electrical machine estimated current based on estimated power-generation torque for controlling power generation of the rotating electrical machine based on the power-generation torque command, the revolution speed of a rotating electrical machine determined by the rotating electrical machine revolution speed acquiring section, and a rotating electrical machine voltage determined by the rotating electrical machine voltage detecting section;
   a generated current difference determining section for determining that a generated current difference has occurred in a case where a rotating electrical machine actual current detected by the rotating electrical machine current detecting section is smaller by a first predetermined value or more than the rotating electrical machine estimated current estimated by the generated current estimating section and outputting limiting power-generation torque for limiting the power-generation torque command, and determining that the generated current difference has not occurred in a case where a difference between the rotating electrical machine actual current and the rotation electrical machine estimated current is smaller than a second predetermined value which is smaller than the first predetermined value from a state in which the generated current difference has occurred and stopping output of the limiting power-generation torque; and
   a power-generation control section for controlling the power generation of the rotating electrical machine in accordance with the estimated power-generation torque with use of the power-generation torque command as the estimated power-generation torque, and controlling the power generation of the rotating electrical machine in accordance with the estimated power-generation torque obtained by limiting the power-generation torque command to the limiting power-generation torque at a time of occurrence of the generated current difference.

2. The vehicle power-generation control device according to claim 1, wherein the generated current difference determining section determines that the generated current difference has occurred in a case where the difference between the rotating electrical machine actual current and the rotating electrical machine estimated current has increased at a predetermined increase rate under a state in which the generated current different has not occurred.

3. The vehicle power-generation control device according to claim 1,
   wherein the generated current difference determining section calculates and sets initial limiting power-generation torque of the rotating electrical machine based on standard drive belt tension set in advance, and
   wherein the power-generation control section limits the power-generation torque command in a range of the initial limiting power-generation torque.

4. The vehicle power-generation control device according to claim 2,
   wherein the generated current difference determining section calculates and sets initial limiting power-generation torque of the rotating electrical machine based on standard drive belt tension set in advance, and
   wherein the power-generation control section limits the power-generation torque command in a range of the initial limiting power-generation torque.

5. The vehicle power-generation control device according to claim 3, further comprising a drive belt tension detecting section for detecting tension of the drive belt,
   wherein the generated current difference determining section corrects the initial limiting power-generation torque based on the tension of the drive belt.

6. The vehicle power-generation control device according to claim 4, further comprising a drive belt tension detecting section for detecting tension of the drive belt,
   wherein the generated current difference determining section corrects the initial limiting power-generation torque based on the tension of the drive belt.

7. The vehicle power-generation control device according to claim 3, further comprising an external temperature detecting section for detecting external temperature of the vehicle,
   wherein the generated current difference determining section corrects the initial limiting power-generation torque based on the external temperature.

8. The vehicle power-generation control device according to claim 4, further comprising an external temperature detecting section for detecting external temperature of the vehicle,
   wherein the generated current difference determining section corrects the initial limiting power-generation torque based on the external temperature.

9. The vehicle power-generation control device according to claim 5, further comprising an external temperature detecting section for detecting external temperature of the vehicle,
   wherein the generated current difference determining section corrects the initial limiting power-generation torque based on the external temperature.

10. The vehicle power-generation control device according to claim 6, further comprising an external temperature detecting section for detecting external temperature of the vehicle,
    wherein the generated current difference determining section corrects the initial limiting power-generation torque based on the external temperature.

11. The vehicle power-generation control device according to claim 1,
    wherein the generated current difference determining section sets learning limiting power-generation torque based on the estimated power-generation torque at a time when the generated current difference has occurred, and wherein the power-generation control section limits the power-generation torque command in a range of the learning limiting power-generation torque.

12. The vehicle power-generation control device according to claim 11,
wherein the generated current difference determining section calculates a generated current difference inexperience integrated time period by integrating a time period during which the estimated power-generation torque is matched with the learning limiting power-generation torque and it is determined that the generated current difference has not occurred, and
wherein, in a case where the generated current difference inexperience integrated time period is a predetermined value or more, the generated current difference determining section increases the learning limiting power-generation torque.

13. The vehicle power-generation control device according to claim 1,
wherein the vehicle further comprises:
a first electricity storage section for supplying electric power to an electric load of the vehicle;
a second electricity storage section for giving and receiving electric power with respect to the rotating electrical machine;
an electric power converting section for converting the electric power and giving and receiving the electric power among the rotating electrical machine, the second electricity storage section, and the first electricity storage section;
an electric power converting section input current detector for detecting an input current of the electric power converting section; and
a second electricity storage section charged current detector for detecting a charged current of the second electricity storage section, and
wherein the rotating electrical machine current detecting section calculates the rotating electrical machine actual current based on currents detected by the electric power converting section input current detector and the second electricity storage section charged current detector.

14. A power-generation control method for a vehicle including:
an internal-combustion engine for giving and receiving motive power with respect to a drive shaft of the vehicle; and
a rotating electrical machine for giving and receiving motive power with respect to the internal-combustion engine through a drive belt, the rotating electrical machine being subjected to variable output control,
the power-generation control method comprising the steps of:
calculating a power-generation torque command for the rotating electrical machine based on a state of the vehicle;
estimating a rotating electrical machine estimated current based on estimated power-generation torque for controlling power generation of the rotating electrical machine based on the power-generation torque command, a number of a rotating electrical machine, and a rotating electrical machine voltage;
determining that a generated current difference has occurred in a case where a rotating electrical machine actual current is smaller by a first predetermined value or more than the rotating electrical machine estimated current and outputting limiting power-generation torque for limiting the power-generation torque command, and determining that the generated current difference has not occurred in a case where a difference between the rotating electrical machine actual current and the rotation electrical machine estimated current is smaller than a second predetermined value which is smaller than the first predetermined value from a state in which the generated current difference has occurred and stopping output of the limiting power-generation torque; and
controlling the power generation of the rotating electrical machine in accordance with the estimated power-generation torque with use of the power-generation torque command as the estimated power-generation torque, and controlling the power generation of the rotating electrical machine in accordance with the estimated power-generation torque obtained by limiting the power-generation torque command to the limiting power-generation torque at a time of occurrence of the generated current difference.

* * * * *